United States Patent
Juang (10) Patent No.: US 8,279,746 B2
(45) Date of Patent: Oct. 2, 2012

(54) APPARATUS AND METHOD FOR PERFORMING A SCAN PROCEDURE AND MOBILE STATION COMPRISING THE SAME

(75) Inventor: Den-Kai Juang, Taichung (TW)

(73) Assignee: Mediatek Inc., Hsinchu (TW)

( * ) Notice: Subject to any disclaimer, the term of this patent is extended or adjusted under 35 U.S.C. 154(b) by 1090 days.

(21) Appl. No.: 12/188,281

(22) Filed: Aug. 8, 2008

(65) Prior Publication Data

US 2009/0092041 A1    Apr. 9, 2009

Related U.S. Application Data

(60) Provisional application No. 60/977,439, filed on Oct. 4, 2007.

(51) Int. Cl.
*H04J 11/00* (2006.01)
*H04J 1/00* (2006.01)
*H04Q 7/00* (2006.01)
*H04B 7/208* (2006.01)

(52) U.S. Cl. ........ 370/210; 370/332; 370/344; 370/480; 375/260

(58) Field of Classification Search ........................ None
See application file for complete search history.

(56) References Cited

U.S. PATENT DOCUMENTS

| | | | |
|---|---|---|---|
| 2007/0010251 A1* | 1/2007 | Cho et al. ........................ | 455/436 |
| 2007/0086388 A1* | 4/2007 | Kang et al. ..................... | 370/331 |
| 2007/0105585 A1* | 5/2007 | Lee et al. ........................ | 455/525 |
| 2007/0149242 A1* | 6/2007 | Kim et al. ....................... | 455/525 |
| 2007/0264933 A1* | 11/2007 | Kang et al. ..................... | 455/13.1 |
| 2007/0280098 A1* | 12/2007 | Bhatt et al. ..................... | 370/208 |
| 2008/0273636 A1* | 11/2008 | Zhu et al. ....................... | 375/345 |
| 2010/0159825 A1* | 6/2010 | Kang et al. ..................... | 455/11.1 |

\* cited by examiner

*Primary Examiner* — Yemane Mesfin
*Assistant Examiner* — Christine Duong
(74) *Attorney, Agent, or Firm* — Grossman, Tucker, Perreault & Pfleger, PLLC (57) ABSTRACT

An apparatus for performing a scan procedure according to an orthogonal frequency division multiple access (OFDMA) signal and a mobile station comprising the same are provided. The characteristic of the apparatus is that it comprises two FIT input buffers. In a first period of a downlink subframe, the first FFT input buffer is used for data transmission. In a second period of the downlink subframe, the second FFT input buffer is used for storing more than one OFDMA sample in advance for further processing. In a third period of an uplink subframe, the stored OFDMA samples can be used to generate a refined frame boundary and calculates a CINR value of each of a plurality of neighboring base stations. Therefore, the apparatus and the MS can perform the scan procedure without downgrading the network efficiency.

17 Claims, 5 Drawing Sheets

APPARATUS AND METHOD FOR PERFORMING A SCAN PROCEDURE AND MOBILE STATION COMPRISING THE SAME

This application claims the benefit of priority based on U.S. Ser. No. 60/977,439 filed on Oct. 4, 2007, the disclosures of which is incorporated herein by reference in its entirety.

CROSS-REFERENCES TO RELATED APPLICATIONS

Not applicable.

BACKGROUND OF THE INVENTION

1. Field of the Invention

The present invention relates to an apparatus, a method for performing a scan procedure, and a mobile station comprising the same. More specifically, the present invention relates to a mobile station, a method for performing a scan procedure according to an orthogonal frequency division multiple access (OFDMA) signal, and a mobile station comprising the same.

2. Descriptions of the Related Art

For OFDMA application over a wireless channel, a mobile station (MS) has to make a connection with a base station (BS) in order to be served. The BS which serves the MS is called the serving BS (SBS) and the other BSs that the MS is able to listen to are called the neighboring BSs (NBSs).

There are some occasions that an MS has to determine whether to switch from its current SBS to one of its NBSs. One of the occasions is when the MS detects that the connection with its SBS is getting worse, and the MS performs a scan procedure to find one of the NBSs to switch to. Another occasion is that the MS keeps monitoring the status of all the NBSs, i.e. the MS periodically performs the scan procedure, and then determines wither to switch from the current SBS to one of its NBSs according to the result of the scan procedure.

A scan procedure is used by an MS to determine whether to switch the SBS, which measures the quality of the physical layer connection with each of the NBSs. The most important factor representing the connection quality is the channel interference and noise ratio (CINR). To measure the CINR of each NBS, an MS must have the identity of the targeting NBS, wherein the identity of the NBS is given by a SBS. When the OFDMA application conforms to the WiMAX standard, the identity is the parameter CELL_ID defined in the WiMAX standard.

A conventional system for performing a scan procedure utilizes one FFT input buffer, thus the data transmission is often temporary suspended during the transmission. The conventional system may not be able to continue the data transmission until the scan procedure has been done. Thus, the performance of the conventional system is degraded while considering the fact of the delay of the scan procedure.

Figure 1:
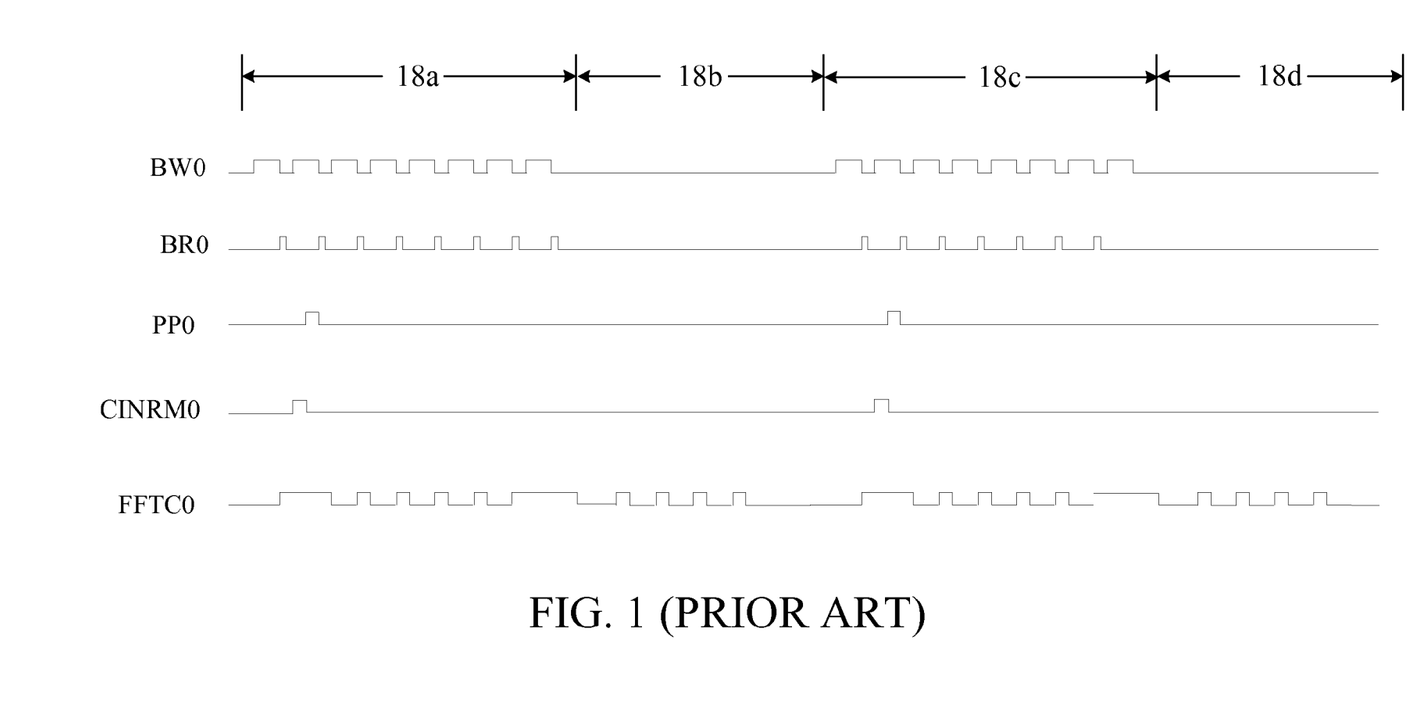
FIG. 1 illustrates a timing diagram of a conventional system.

Please refer to FIG. 1 for better understanding. FIG. 1 illustrates a timing diagram of the conventional system, wherein the time periods 18a, 18c correspond to downlink subframes, the time periods 18b, 18d correspond to uplink subframes, signal BW0 indicates the buffer read of a single FFT buffer, signal BR0 indicates buffer write of the single FFT buffer, signal PP0 indicates the signal of the post-FFT processing, signal CINRM0 indicates the signal of the CINR measurement, and signal FFTC0 indicates the signal of the FFT.

It is noted that the generations of the refined frame boundaries and the CINR values for NBSs happen at the beginning of each downlink sub-frame, which is shown by the toggles of the signals BR0, BW0, PP0, CINRM0, FFTC0 at the beginning of the downlink subframe 18a, 18c. After the generations of the refined frame boundaries and the calculations of the CINRs for NBSs, the conventional system continues to transmit data. From FIG. 1, it is shown that the single FFT buffer, the post-FFT processing, and the CINR measurement are not able to perform effective post-processing during the period correspond to uplink subframe 18b, 18d.

Form the viewpoint of the hardware, the scan procedure is no different from a normal receive, so no extra hardware is required. However, before starting the scan procedure, the convention system has to request a period to its SBS, since it will lose track of the SBS during the scan procedure. That is, the data transmission is delayed by the scan procedure. Thus, the request/grant procedure for the scan procedure will downgrade the network efficiency.

Other conventional systems are to duplicate CINR measurement for measuring CINR values of different NBSs. The post-FFT processing does not need to generate a refined frame boundary for each NBS. Each of the CINR measurement are measured of the CINR value of the corresponding NBS based on the frame boundary of the SBS but not the refined frame boundary of the NBS. Therefore, the network efficiency is not downgraded when this scan procedure is applied. Regarding to this system, the quality of the CINR measurement suffers from the frame boundary mismatch, especially when it is a large delay spread channel. Moreover, this system raises the cost for utilizing extra CINR measurement modules.

According to the aforementioned description, it is desirable to provide a technique that can perform a scan procedure without downgrading the network efficiency.

SUMMARY OF THE INVENTION

An objective of this invention is to provide an apparatus for performing a scan procedure according to an OFDMA signal. The processing module comprises a first fast Fourier transform (FFT) input buffer, a second FFT input buffer, an FFT core module, a post-FFT processing module, and a channel interference and noise ratio (CINR) measurement module. The first FFT input buffer is configured to contiguously gather a first predetermined number of OFDMA samples related to the OFDMA signal during a first period corresponding to a downlink subframe. The second FFT input buffer is configured to gather a second predetermined number of OFDMA samples related to the OFDMA signal during a second period corresponding to the downlink subframe. The FFT core module is configure to contiguously apply FFT to the first predetermined number of OFDMA samples during the first period and apply FFT to the second predetermined number of OFDMA samples during a third period corresponding to an uplink subframe, the uplink subframe occurs later than the downlink subframe.

Another objective of this invention is to provide a mobile station comprising an antenna for receiving an OFDM signal and a processing module for performing a scan procedure according to the OFDMA signal. The processing module comprises an first FFT input buffer, a second FFT input buffer, an FFT core module, a post-FFT processing module, and a CINR measurement module. The first FFT input buffer is configured to contiguously gather a first predetermined number of OFDMA samples related to the OFDMA signal during a first period corresponding to a downlink subframe. The second FFT input buffer is configured to gather a second predetermined number of OFDMA samples related to the OFDMA signal during a second period corresponding to the downlink subframe. The FFT core module is configure to contiguously apply FFT to the first predetermined number of OFDMA samples during the first period and apply FFT to the second predetermined number of OFDMA samples during a third period corresponding to an uplink subframe, the uplink subframe occurs later than the downlink subframe.

Another objective of this invention is to provide a method for performing a scan procedure according to an OFDMA signal. The method comprises the steps of: (a) gathering a first predetermined number of OFDMA samples related to the OFDMA signal contiguously during a first period corresponding to a downlink subframe; (b) gathering a second predetermined number of OFDMA samples related to the OFDMA signal during a second period corresponding to the downlink subframe; (c) applying FFT to the first predetermined number of OFDMA samples contiguously during the first period; (d) applying FFT to the second predetermined number of OFDMA samples during a third period corresponding to an uplink subframe occurring later than the downlink subframe; (e) measuring a frame boundary of an SBS during the first period; (f) measuring a refined frame boundary of at least one NBS according to the second predetermined number of OFDMA samples and the frame boundary during the third period; and (g) calculating a CINR value of the at least one NBS based on the refined frame boundary.

By adding the second FFT input buffer, the present invention can store more than one OFDMA sample during the second period of the downlink subframe. Then in the third period of uplink subframe, the present invention can retrieve the stored OFDMA samples to generate a CINR values for each of a plurality of NBSs of the apparatus and/or the MS according to the stored sample. In this way, the present invention can achieve the purposes of measuring a CINR value of each of the NBSs without downgrading the network efficiency. With the aforementioned arrangement, the present invention solves the disadvantages of the convention techniques and still has good performance.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the descriptions that follow, the present invention will be described in reference to descriptions and examples about performing a scan procedure over a wireless channel. However, descriptions and examples of the invention are not limited to any particular environment, application, or implementation. Therefore, the descriptions that follow are for the purposes of illustration and not limitation.

Figure 2:
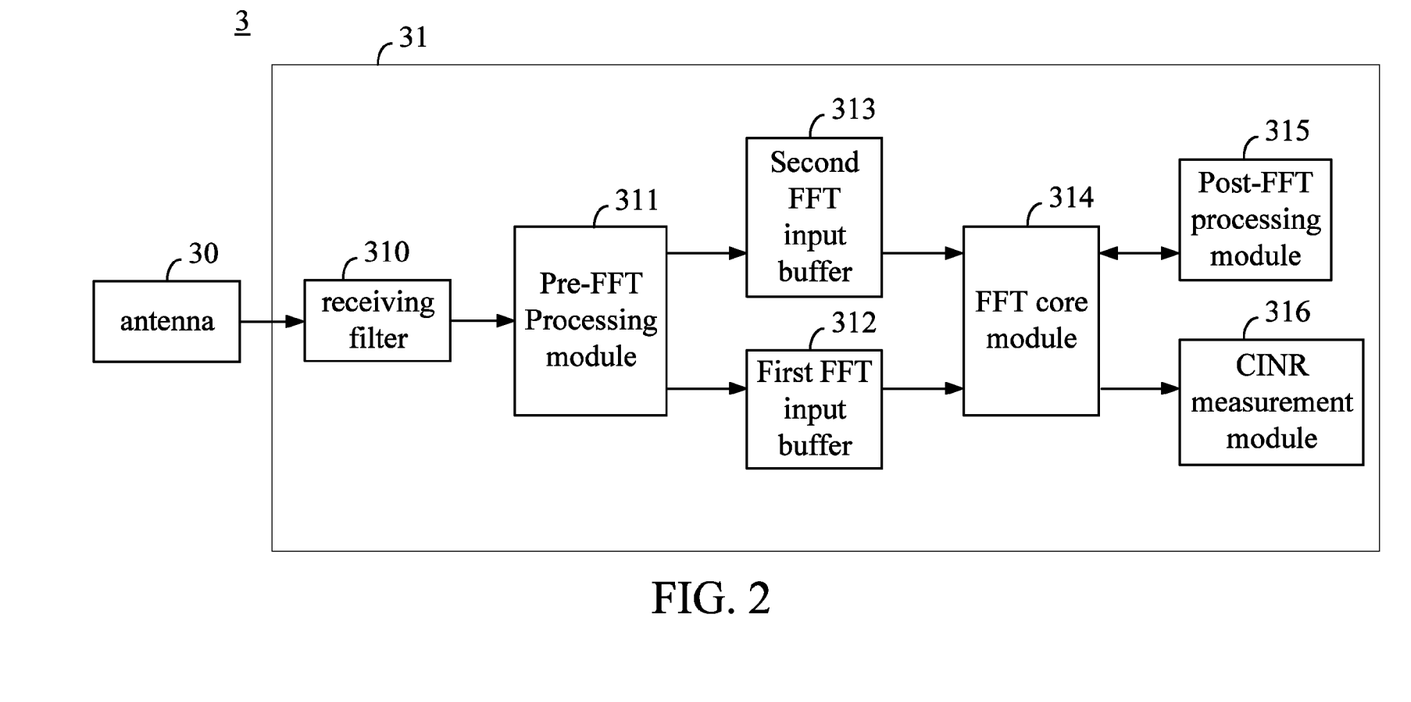
FIG. 2 is a block diagram of the mobile station of the first embodiment of the present invention.

A first embodiment of the present invention is a mobile station (MS) 3, whose block diagram is illustrated in FIG. 2. The MS 3 is served by a serving base station (SBS). Meantime, there are a plurality of neighboring BSs (NBSs) not serving the MS 3 but being listened by the MS 3. The MS 3 has the capacity of measuring the channel interference and noise ratio (CINR) value for each of the NBSs so that it can switch from the current SBS to one of its NBSs according to the measured CINR values for some occasions.

The MS 3 comprises an antenna 30 and a processing module 31. The antenna 30 is used for receiving an OFDM signal, while the processing module 31 is used for performing a scan procedure according to the OFDMA signal. The processing module 31 comprises a receiving filter 310, a pre-Fast Fourier Transform (FFT) processing module 311, a first FFT input buffer 312, a second FFT input buffer 313, an FFT core module 314, a post-FFT processing module 315, and a CINR measurement module 316.

First, the antenna 30 receives the OFDMA signal, which comprises a sub-signal from each of the SBS and the NBSs. That is, the OFDMA signal is substantially a mixed signal of the sub-signals from the SBS and the NBSs. The receiving filter 310 filters the OFDMA signal. After filtering, the pre-FFT processing module 311 processes the OFDMA signal. More specifically, the pre-FFT processing module 311 is used for processing the OFDMA signal before the first FFT input buffer 312 gathers a first predetermined number of OFDMA sample and the second FFT input buffer 313 gathers a second predetermined number of OFDMA samples. The roles of the first FFT input buffer 312 and the second FFT input buffer 313 are different, so they are described separately in the following paragraphs.

The first FFT input buffer 312 and data flows related to the first FFT input buffer 312 are described first. The size of the first FFT input buffer 312 is equal to the first predetermined number of OFDMA samples. The first FFT input buffer 312 is used for contiguously gathering the first predetermined number of OFDMA samples related to the OFDMA signal during a first period corresponding to a downlink subframe. It means that the first input buffer 312 contiguously gathers the first predetermined number of OFDMA samples from the signal outputted from the pre-FFT processing module 311. In this embodiment, the first predetermined number is one symbol. Hence, the first FFT input buffer 312 is used for gathering one OFDMA sample for FIT processing. In addition, the first FFT input buffer 312 forward the captured OFDMA preamble to FFT core module 314, and the preamble is overwritten by the incoming OFDMA samples. Please note that the preamble in the present invention is referred to the first sample of a plurality of OFDMA samples in one frame.

The FFT core module 314 is used for contiguously applying FFT to the first predetermined number of OFDMA samples during the first period. The post-FFT processing module 315 is used for measuring a frame boundary of the SBS during the first period. After the frame boundary of the SBS has been measured, the first FFT input buffer 312 gathers the first predetermined number of OFDMA samples (i.e. gathers next OFDMA sample), applies FFT to the first predetermined number of OFDMA samples again during the first period corresponds to the downlink subframe. It means that after the frame boundary of the SBS has been measured, the first FIT input buffer 312 and the FFT core module 314 perform data transmissions during the first period corresponding to the downlink subframe.

Then, the second FFT input buffer 313 and data flows related to the second FFT input buffer 313 are described. The size of the second FFT input buffer 313 is equal to the second predetermined number of OFDMA samples. The second FFT input buffer 313 is used for gathering the second predetermined number of OFDMA samples related to the OFDMA signal during a second period corresponding to the downlink subframe. It means that the second FFT input buffer 313 gathers the second predetermined number of OFDMA samples from the signal outputted from the pre-FFT processing module 22. The second period and the first period may overlap. In this embodiment, the second predetermined number is greater than one. Hence, the second FIT input buffer 313 is used for gathering more than one OFDMA sample (such as 1.5 OFDMA samples) for FIT processing.

In the present invention, the second predetermined number should be slightly larger than the first predetermined number because the size of the second FFT input buffer 313 has to be large enough to tolerate the difference of frame boundaries between the SBS and NBSs. The size of the second FFT input buffer 313 needs to cover the frame boundary window of SBS and all NBSs, while the size of the first FFT input buffer 312 may only need to cover the frame boundary window of SBS. Since the MS 3 receives the data from the SBS and NBSs generally within the different arrival times, the size of the second FFT input buffer 313 needs to be large enough to cover all of the SBS and NBSs frame boundaries.

Figure 3:
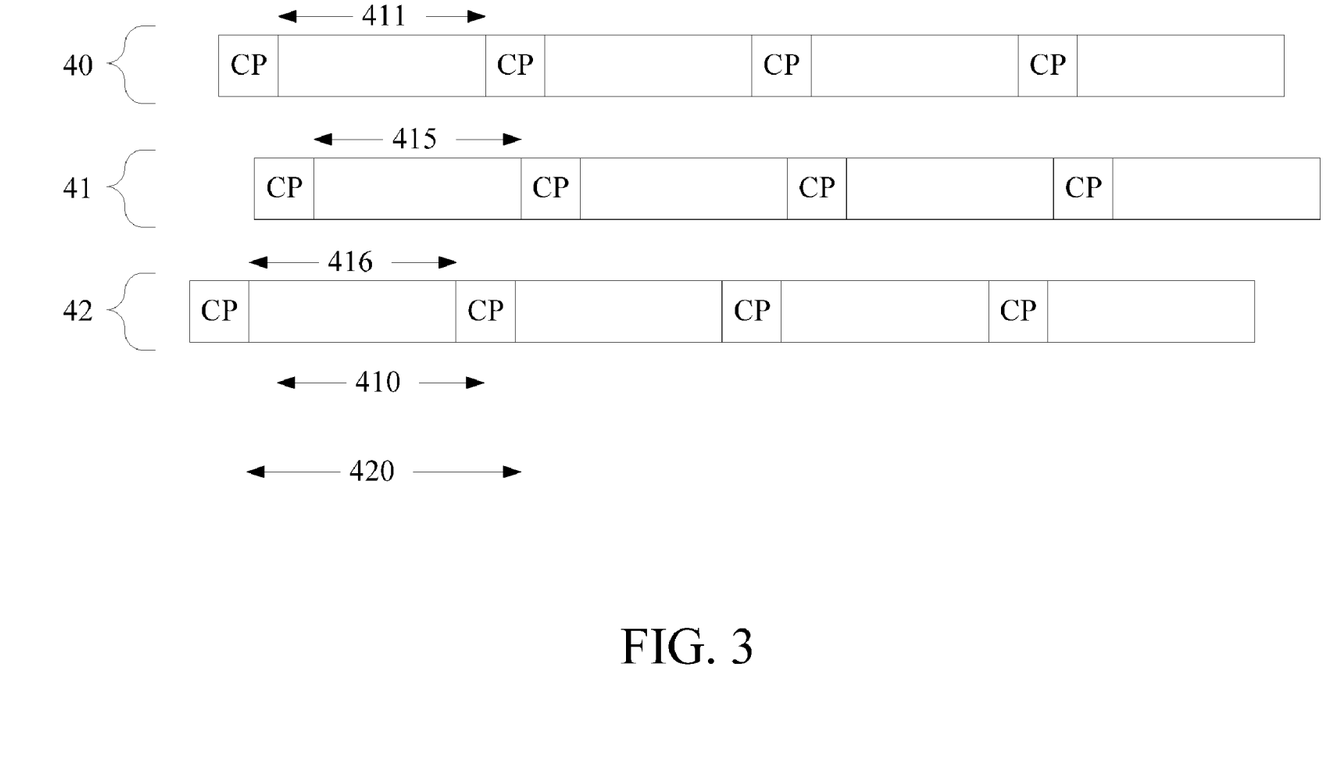
FIG. 3 is a schematic view of the sub-signals and the capture windows.

Please refers to FIG. 3, which is a schematic view of the sub-signals and the capture windows. The MS 3 receives the sub-signal 40 from the SBS and the sub-signals from all the NBSs; specifically, sub-signal 41 from the first NBS and sub-signal 42 from the second NBS. Each of the sub-signals 40, 41, 42 comprises a plurality of frames, and each of the frames begins with a cyclic prefix CP and comprises a preamble, a downlink sub-frame and an uplink sub-frame.

The first predetermined numbers 410 indicates the minimum size of the first input buffer 312. The second predetermined number 420 indicates the minimum size of the second input buffer 313. The window 411 for the frame boundary of the sub-signal 40 from the SBS is equal to the size of the first predetermined number 410, which is the size of first input buffer 312 in the embodiment of the present invention. The second predetermined number 420, as the size of the second input buffer 313, needs to cover the windows for the frame boundaries of the sub-signals from the SBS and all NBSs. The frame boundary of the sub-signal 41 from the first NBS occurs in the window 415, while the frame boundary of the sub-signal 42 from the second NBS occurs in the window 416. Thus, the second predetermined number 420 needs to be large enough to cover the windows 411, 415, and 416 in the embodiment of the present invention. The second predetermined number 420 may be interpreted as the window from the earliest arriving frame start-point to the latest frame end-point. In this case, the earliest arriving frame start-point is from the second NBS and the latest arriving frame end-point is from the first NBS.

The second predetermined number of OFDMA samples comprises a preamble of the OFDMA signal. After the second FFT input buffer 313 has gathered the second predetermined number of OFDMA samples, it stops and does not change its content during a rest period corresponding to the downlink subframe. Comparing to the first input buffer 312, the preamble data of the OFDMA sample in the first FFT input buffer 312 is contiguously overwritten by the new incoming OFDMA samples.

Then, during a third period corresponding to an uplink subframe occurring later than the downlink subframe, the FFT core module 314 applies FFT to the second predetermined number of OFDMA samples. The post-FFT processing module 315 measures a refined frame boundary of each of the NBSs according to the second predetermined number of OFDMA samples, the identities of the NBSs, and the frame boundary during the third period. To be more specific, the sub-signal from the SBS mixed in the OFDMA signal comprises an identity of each of the NBSs; therefore, the MS 3 has the information of the identities of the NBSs. The CINR measurement module 316 calculates a CINR value of each of the NBSs based on the refined frame boundary and according to the corresponding NBS identity.

In this embodiment, the MS 3, the SBS, and the NBSs conform to the WiMAX standard and the identities are CELL_IDs defined in the WiMAX standard. In the other embodiments, the MS 3, the SBS, and the NBSs may conform to the other wireless network standards.

Figure 4:
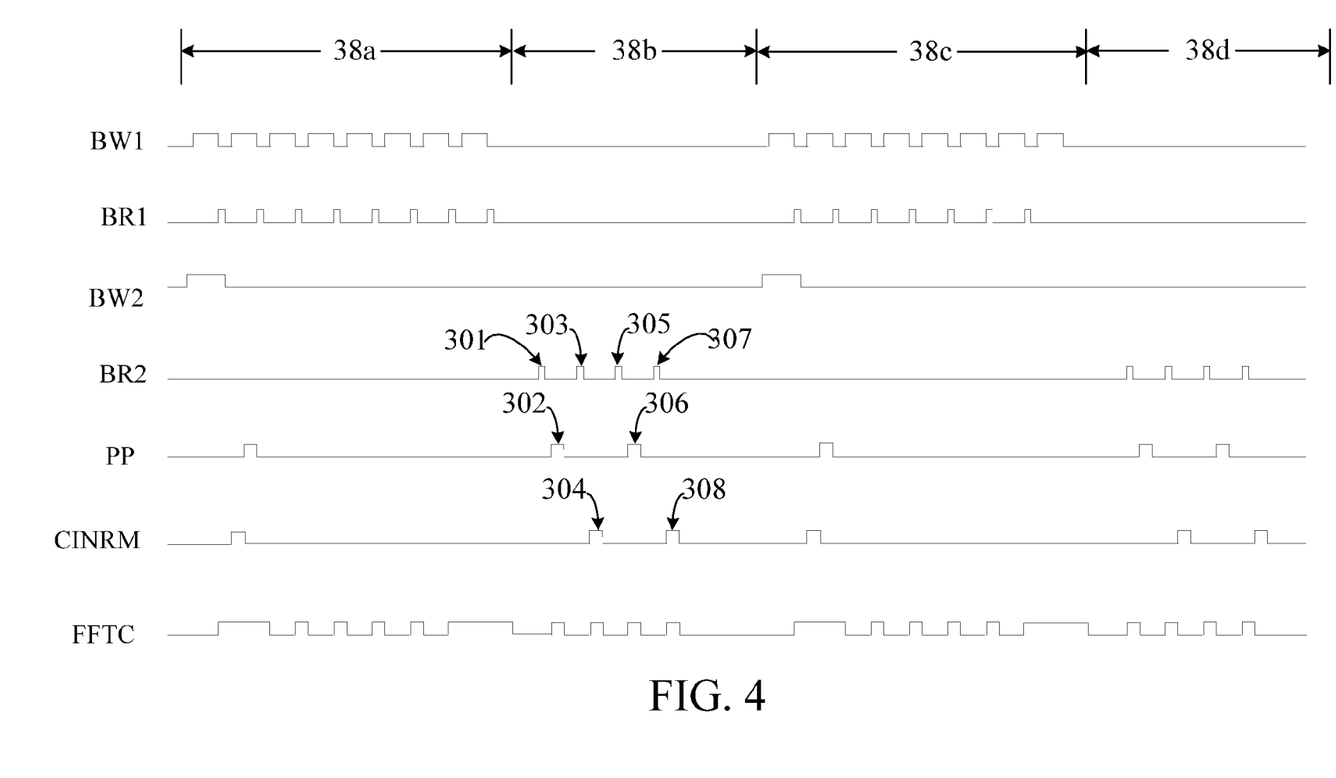
FIG. 4 is an exemplary timing diagram for the mobile station of the present invention.

Please refer to FIG. 4 for better understanding. FIG. 4 illustrates an exemplary timing diagram of the MS 3, wherein the time periods 38a, 38c correspond to downlink subframes, the time periods 38b, 38d correspond to uplink subframes, signal BW1 indicates the buffer read of the first FFT input buffer 312, signal BR1 indicates buffer write of the first FFT input buffer 312, signal BW2 indicates the buffer write of the second FFT input buffer 313, signal BR2 indicates the buffer read of the second FFT input buffer 313, signal PP indicates the signal of the post-FFT processing module 315, signal CINRM indicates the signal of the CINR measurement module 316, and signal FFTC indicates the signal of the FFT core module 314.

From the signals BR1, BW1, it can bee seen that the buffer read and the buffer write of the first FFT input buffer 312 are similar to those of the FFT input buffers 13 in the conventional system 1. It means that the first input buffer 312 performs both buffer read and buffer write during a period correspond to the downlink subframes 38a, 38c. From the signal FFTC, the operations performs by the FFT core module 314 is similar to those of the FFT core module 14 in the conventional system 1. On the other hand, it is noted that the signal BW2 only toggles at the beginning of the downlink subframe 38a. It means that the second FFT input buffer 313 gathers the second predetermined number of OFDMA samples for future process, and it stops after the second predetermined number of OFDMA samples have been gathered.

In the uplink subframe 38b, the signal BR2 toggles several times, meaning that the OFDMA samples in the second FFT input buffer 313 are read out to generate a refined frame boundary for each of the NBSs and to calculate the CINR for each of the NBSs. To be more specific, the toggle 301 of the signal BR2 means that the OFDMA samples in the second FFT input buffer 34 are read out, and the toggle 302 of the signal PP means that the post-FFT processing module 315 generates a refined frame boundary for one of the NBSs according to the frame boundary of the SBS and the identity of the NBS. Then, the toggle 303 of the signal BR2 means that the OFDMA samples in the second FFT input buffer 34 are read out again, and the toggle 304 of the signal CINRM means that the CINR measurement module 316 generates the CINR value of the selected NBS according to its refined frame boundary. Next, the processing module 31 selects another NBS by indicating the corresponding identity. Then, the toggle 305 of the signal BR2, the toggle 306 of the signal PP, the toggle 307 of the signal BR2, and the toggle 308 of the signal CINRM are for another NBS, and the toggles 305, 306, 307, 308 play the same roles as the toggles 301, 302, 303, 304, respectively. After deriving the CINRs of the NBSs, the processing module 31 may determine whether to switch its SBS from the current one to one of its NBSs according to the CINR values.

It is noted that an MS may only have one NBS in some other embodiments. For MS only has one NBS, the MS perform the aforementioned operations for that single NBS. In addition, the processing module may operate with other antennas in other embodiments.

Figure 5:
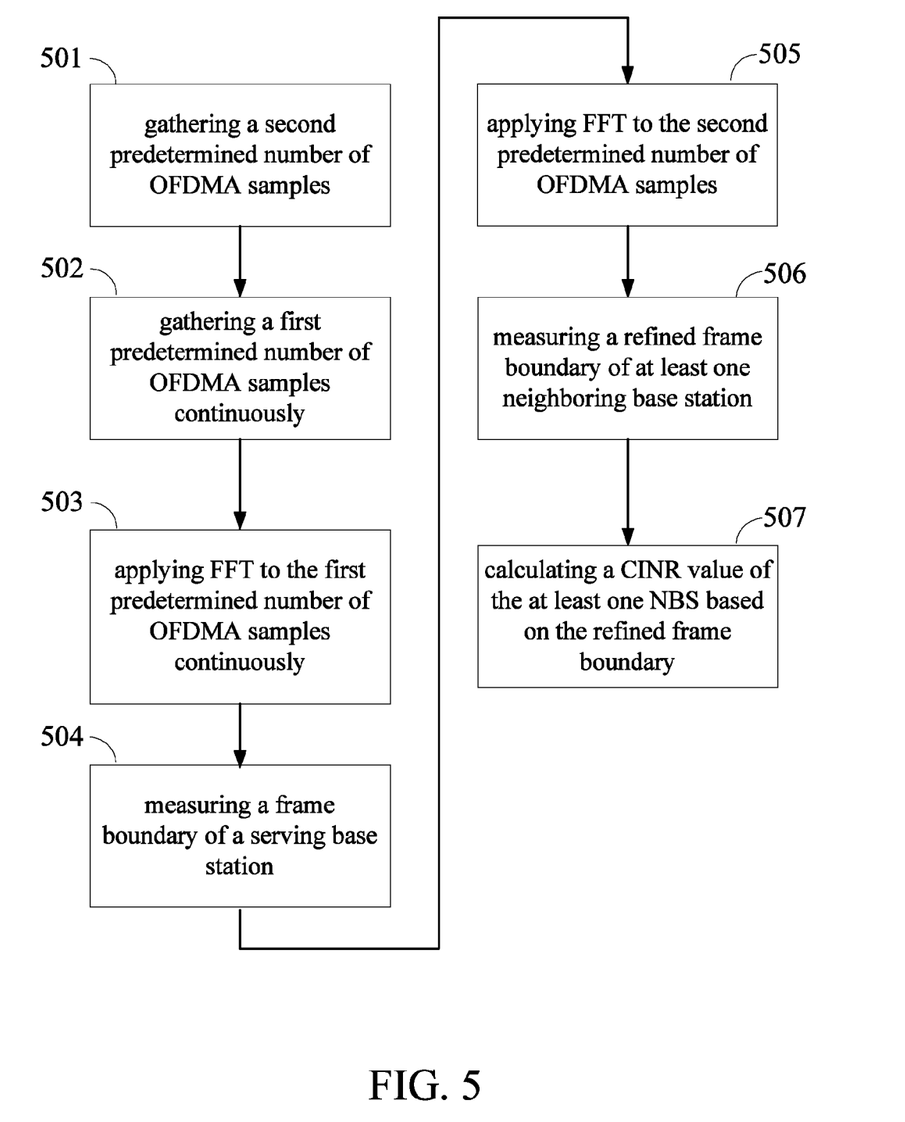
FIG. 5 is a flowchart of the second embodiment of the present invention.

A second embodiment of the present invention is illustrated in FIG. 5, which is a flowchart of a method for performing a scan procedure according to an OFDMA signal. First, step 501 is executed to gather a second predetermined number of OFDMA samples related to the OFDMA signal during a second period corresponding to the downlink subframe. Then, step 502 is executed to contiguously gather a first predetermined number of OFDMA samples related to the OFDMA signal during a first period corresponding to a downlink subframe. In this embodiment, the first predetermined number of OFDMA samples comprise a preamble of the OFDMA signal, and the second predetermined number is greater than the first predetermined number. It is noted, the method may begin the step 501 and step 502 simultaneously. In that case, the step 501 is finished before the step 502.

Step 503 is executed to contiguously apply FFT to the first predetermined number of OFDMA samples during the first period. Then, step 504 is executed to measure a frame boundary of an SBS during the first period. Step 505 is executed to apply FFT to the second predetermined number of OFDMA samples during a third period corresponding to an uplink subframe occurring later than the downlink subframe. Step 506 is executed to measure a refined frame boundary of at least one NBS according to the second predetermined number of OFDMA samples and the frame boundary during the third period. Finally, Step 507 is executed to calculate a CINR value of the at least one NBS based on the refined frame boundary.

In addition to the aforesaid steps, the second embodiment can also execute all the operations and functions of the first embodiment. Those skilled in the art will readily know how the second embodiment executes the corresponding operations and functions based on the explanation of the first embodiment, and thus, no further description will be given herein.

Comparing with the conventional system, the MS 3 is equipped with the additional second FFT input buffer 313 to store the second predetermined number of OFDMA samples in the second period corresponding to downlink subframe. It is noted that the size of the second FFT input buffer 313 should be large enough to tolerate the difference of frame boundaries between an SBS and an NBS. In addition, every time the MS 3 performs a scan procedure, it calculates the frame boundary of an SBS. Therefore the MS 3 can overcome the disadvantage of the frame boundary mismatch of the large delay spread channel, and the performance is superior to the conventional system.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An apparatus for performing a scan procedure according to an orthogonal frequency division multiple access (OFDMA) signal, comprising:
   a first fast Fourier transform (FFT) input buffer for contiguously gathering a first predetermined number of OFDMA samples related to the OFDMA signal during a first period corresponding to a downlink subframe;
   a second FFT input buffer for gathering a second predetermined number of OFDMA samples related to the OFDMA signal during a second period corresponding to the downlink subframe;
   an FFT core module for contiguously applying FFT to the first predetermined number of OFDMA samples during the first period and for applying FFT to the second predetermined number of OFDMA samples during a third period corresponding to an uplink subframe, the uplink subframe occurring later than the downlink subframe;
   a post-FFT processing module for measuring a frame boundary of a serving base station (SBS) of the apparatus during the first period and for measuring a refined frame boundary of at least one neighboring base station (NBS) of the apparatus according to the second predetermined number of OFDMA samples and the frame boundary during the third period; and
   a channel interference and noise ratio (CINR) measurement module for calculating a CINR value of the at least one NBS based on the refined frame boundary.

2. The apparatus of claim 1, wherein the OFDMA signal comprises a sub-signal from the SBS and each of the at least one NBS.

3. The apparatus of claim 2, wherein the sub-signal from the SBS comprises an identity of the at least one NBSs, the post-FFT processing module measures the refined frame boundary of the at least one NBSs according to the corresponding identity, and the CINR measurement module calculates the CINR value of the at least one NBSs according to the corresponding identity.

4. The apparatus of claim 1, wherein the first predetermined number of OFDMA samples comprises a preamble of the OFDMA signal in the first input buffer, the preamble in the first input buffer is overwritten after the preamble in the first input buffer is forwarded to the FFT core module.

5. The apparatus of claim 1, wherein the second predetermined number is greater than the first predetermined number.

6. The apparatus of claim 1, further comprising:
   a receiving filter for filtering the OFDMA signal; and
   a pre-FFT processing module for processing the OFDMA signal before the first predetermined number of OFDMA samples are gathered and the second predetermined number of OFDMA samples are gathered.

7. The apparatus of claim 3, wherein the apparatus, the SBS, and the NBSs conform to the Worldwide Interoperability for Microwave Access (WiMAX) standard and the identities are CELL_IDs defined in the WiMAX standard.

8. A mobile station (MS), comprising:
   an antenna for receiving an OFDMA signal; and
   a processing module for performing a scan procedure according to the OFDMA signal, comprising:
      a first FFT input buffer for contiguously gathering a first predetermined number of OFDMA samples related to the OFDMA signal during a first period corresponding to a downlink subframe;
      a second FFT input buffer for gathering a second predetermined number of OFDMA samples related to the OFDMA signal during a second period corresponding to the downlink subframe;
      an FFT core module for contiguously applying FFT to the first predetermined number of OFDMA samples during the first period and for applying FFT to the second predetermined number of OFDMA samples during a third period corresponding to an uplink subframe, the uplink subframe occurring later than the downlink subframe;

a post-FFT processing module for measuring a frame boundary of an SBS of the MS during the first period and for measuring a refined frame boundary of at least one NBS of the MS according to the second predetermined number of OFDMA samples and the frame boundary during the third period; and a CINR measurement module for calculating a CINR value of the at least one NBS based on the refined frame boundary.

9. The MS of claim 8, wherein the OFDMA signal comprises a sub-signal from the SBS and the at least one NBSs.

10. The MS of claim 9, wherein the sub-signal from the SBS comprises an identity of the at least one NBSs, the post-FFT processing module measures the refined frame boundary of the at least one NBSs according to the corresponding identity, and the CINR measurement module calculates the CINR value of the at least one NBSs according to the corresponding identity.

11. The MS of claim 8, wherein the first predetermined number of OFDMA samples comprise a preamble of the OFDMA signal in the first input buffer, the preamble in the first input buffer is overwritten after the preamble in the first input buffer is forwarded to the FFT core module.

12. The MS of claim 8, wherein the second predetermined number is greater than the first predetermined number.

13. The MS of claim 8, wherein the processing module further comprises:

a receiving filter for filtering the OFDMA signal; and a pre-FFT processing module for processing the OFDMA signal before the first predetermined number of OFDMA samples are gathered and the second predetermined number of OFDMA samples are gathered.

14. The MS of claim 9, wherein the MS, the SBS, and the NBSs conform to the WiMAX standard and the identities are CELL_IDs defined in the WiMAX standard.

15. A method for performing a scan procedure according to an OFDMA signal, comprising the steps of:

gathering a first predetermined number of OFDMA samples related to the OFDMA signal contiguously during a first period corresponding to a downlink subframe;

gathering a second predetermined number of OFDMA samples related to the OFDMA signal during a second period corresponding to the downlink subframe;

applying FFT to the first predetermined number of OFDMA samples contiguously during the first period;

applying FFT to the second predetermined number of OFDMA samples during a third period corresponding to an uplink subframe occurring later than the downlink subframe;

measuring a frame boundary of an SBS during the first period;

measuring a refined frame boundary of at least one NBS according to the second predetermined number of OFDMA samples and the frame boundary during the third period; and calculating a CINR value of the at least one NBS based on the refined frame boundary.

16. The method of claim 15, wherein the first predetermined number of OFDMA samples comprise a preamble of the OFDMA signal in the first input buffer, the preamble in the first input buffer is overwritten after the preamble in the first input buffer is forwarded to process FFT.

17. The method of claim 15, wherein the second predetermined number is greater than the first predetermined number.

* * * * *